United States Patent [19]
Hirata

[11] 3,804,500
[45] Apr. 16, 1974

[54] APPARATUS FOR DETECTING BATTERY VOLTAGE FOR D.C. MICROMOTOR EQUIPPED WITH SPEED GOVERNOR

[75] Inventor: Hiroshi Hirata, Sakai, Japan

[73] Assignee: Minolta Camera Kabushiki Kaisha, Osaka, Japan

[22] Filed: June 1, 1972

[21] Appl. No.: 258,759

[30] Foreign Application Priority Data
July 21, 1971 Japan.............................. 46-64585
Sept. 9, 1971 Japan.............................. 46-88805

[52] U.S. Cl. ................................................ 352/171
[51] Int. Cl. ............................................... G03b 1/00
[58] Field of Search ............ 352/170, 171; 318/349, 318/359, 490

[56] References Cited
UNITED STATES PATENTS
3,366,862  1/1968  Beck et al...................... 318/349 X
3,519,340  7/1970  Vockenhuber et al. ......... 352/171 X
1,039,568  9/1912  McLain............................ 318/359 X
3,328,613  6/1967  Gawron ........................... 318/345 X OTHER PUBLICATIONS
Small Movies (High Technic Series 4–Movie Machine Parts) May, 1970, P. 53

*Primary Examiner*—Samuel S. Matthews
*Assistant Examiner*—Michael L. Gellner
*Attorney, Agent, or Firm*—Wolder & Gross

[57] ABSTRACT

An apparatus comprising a speed governor for keeping a direct current micromotor rotating in steady state by regulating current flowing through the rotor of the motor, a battery serving as a power source for supplying power to the motor by way of the speed governor, and a lamp incorporated in the circuit of the speed governor. The lamp is lighted when voltage supplied from the battery is higher than the level required for operating the load and is turned off when the voltage is not higher than the required level.

7 Claims, 4 Drawing Figures

APPARATUS FOR DETECTING BATTERY VOLTAGE FOR D.C. MICROMOTOR EQUIPPED WITH SPEED GOVERNOR

BACKGROUND OF THE INVENTION

The present invention relates to an apparatus for detecting the voltage of a power source battery for a miniature cine camera or the like which employs a direct current micromotor equipped with a speed governor, more particularly to an apparatus to be incorporated in a miniature cine camera or the like for detecting the state of power consumption of the power source battery.

With an apparatus for detecting the battery voltage generally employed, current almost equal to the current that flows during loaded operation is passed through the detecting apparatus, or voltage detection is conducted during a loaded operation, with voltage reduction due to internal resistance of the battery and the like taken into consideration, so as to detect the voltage equivalent to actual voltage applied to the motor during operation.

In the case of a detecting apparatus incorporating a galvanometer for detecting the battery voltage, there is a need to use a voltage dividing resistor, current dividing resistor or a switch for detecting purposes in addition to the galvanometer. In another type of apparatus wherein a built-in galvanometer for some other purpose is utilized also for the detection of battery voltage, it is required to use at least one circuit for detecting the battery voltage including a two-contact change-over switch, and some apparatuses further need the use of a current dividing resistor, voltage dividing resistor or a switch for detecting purposes.

Further another type of apparatus including a lamp for detecting the voltage requires a lamp, a constant voltage circuit and a detecting circuit and there are cases wherein a current dividing resistor, voltage dividing resistor or a switch for detecting purposes is additionally necessary.

Although the detecting apparatuses of the type described are not directly associated with the operation of the load, such apparatus has the disadvantage that if it is attempted to incorporate the apparatus in a commercial product such as a miniature cine camera which is relatively low-priced, the apparatus will be too costly relative to the price of the product.

On the other hand, for a direct current micromotor so designed that the revolution number (i.e., rotational speed) thereof is variable stepwise at a plurality of levels, the apparatus is generally adapted to keep its maximum revolution number, with the resultant disadvantage that although steady-state rotation can be achieved at lower revolution numbers, there is involved a range in which the detecting apparatus gives an indication of improper voltage level, making it impossible to fully utilize the capacity of the battery.

The voltage for maintaining steady-state rotation increases proportionally to the increase in revolution number. Accordingly, change-over of the conventional detecting apparatus in accordance with the varying speed needs additional current dividing resistors, voltage dividing resistors, switches and the like, hence the apparatus becomes costly.

SUMMARY OF THE INVENTION

An object of this invention is to provide an apparatus for detecting battery voltage which can be economically incorporated in an apparatus employing a direct current micromotor equipped with a speed governor, the detecting apparatus being capable of detecting battery voltage for each level of revolution number of the motor which is rotatable at a plurality of stepwisely set levels of revolution number.

Another object of this invention is to provide an apparatus of the type described which is capable of detecting battery voltage all the time irrespective of whether the direct current micromotor is in loaded operation or in idle operation.

Still another object of this invention is to provide an apparatus for indicating for example in the finder of a cine camera the result of detection of the battery voltage.

According to the present invention, there is provided an apparatus comprising an electric circuit for driving a direct current micromotor, a speed governor incorporated in the circuit for keeping the motor rotating in steady state by regulating the current flowing through the rotor of the motor, and a lamp incorporated in the electric circuit of the speed governor and adapted to be lighted when supplied with the excess or remainder of a power supplied from a power source minus a power required for operating the load.

The lamp is lighted in operative relation to opening and closing of contact of the speed governor while the voltage of the battery is in excess of a level required for maintaining steady-state rotation of the motor during its loaded operation and is turned off when the governor becomes no longer operable at its contact due to the reduction of the battery voltage below a level necessary to maintain a predetermined motor speed. If the motor is such that the revolution number thereof is variable stepwise at a plurality of levels and even when such motor fails to keep its maximum revolution number, the lamp will be turned on again if the motor is set for rotation at a sequentially lower revolution number, provided that the rotation at this speed level can be maintained.

Thus it has become possible to detect the battery voltage during a loaded operation of the motor. The detecting apparatus can be built, as it is, in a camera such as a cine camera.

With the foregoing apparatus, however, it is noted that, even if the battery voltage is lower than is needed to maintain steady-state rotation of the loaded motor, the lamp will be lighted upon the energization of the motor while the film has not been loaded in the camera, because the speed governor is brought into operation. Such objection may be avoided by applying the idly rotating motor a mechanical load almost equal to the load to which it is subjected during a loaded operation and by removing the mechanical load when it is driven for a loaded operation.

This can be achieved by a construction wherein while the film is not loaded the idly rotating motor is subjected, under the action of friction means, to a load nearly equivalent to the load of loaded operation and the mechanical load is removed when it is detected that the film is loaded.

Thus according to this invention, the detecting apparatus comprises a lamp incorporated in the circuit of speed governor, and voltage detection during unloaded operation of the motor can be achieved through additional provision of only a small number of simple members, with the resulting advantage that the apparatus is very suitable for use in an inexpensive miniature cine camera and is economical relative to the price of the camera in which it is to be incorporated.

Preferably, the lamp may be so disposed that the photographer can view the lamp in the camera finder as it turns on and off.

Other objects and features of this invention will become more apparent form the following detailed description of the embodiments.

DESCRIPTION OF THE PREFERRED EMBODIMENTS

Figure 1:
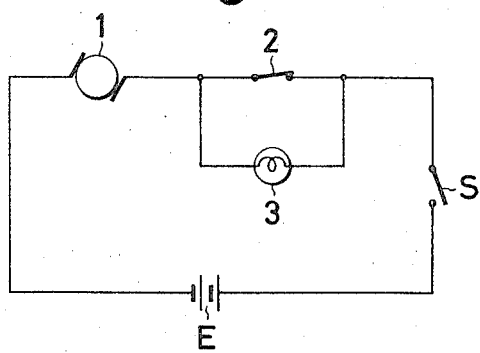
FIG. 1 is an electric circuit diagram of an example of a speed governor for a direct current micromotor in accordance with the present invention.

FIG. 1 shows a battery E and a main switch S. When the main switch S is closed, a rotor 1 is driven. Connected in series to the rotor 1 is a switch 2 which is which may be a component of a well known governor mechanism and is opened and closed under the action of a centrifugal force produced by the rotation of the rotor 1 to regulate the current supplied to the rotor 1 and thereby keep its rotation at a predetermined speed. A lamp 3 is connected in parallel to the switch 2. Thus the lamp 3 serves as a resistor for preventing sparking which may to be otherwise produced between the contacts of the switch when it is opened or closed. The switch 2 and the lamp 3 constitute a speed governor. More specifically, when a voltage higher than is necessary for keeping steady-state rotation of the motor is applied across the rotor 1, the switch 2 opens and closes periodically in the well known manner to regulate the current flowing through the rotor 1 and thereby assure steady-state rotation. The lamp 3 is lighted with a portion of power supplied from the battery E.

In the case of a speed governor (not shown) of known type wherein a semiconductor regulates the current flowing through the rotor, there is provided a semiconductor switch corresponding to the switch 2 and a portion of the power supplied from the battery is also consumed within the semiconductor switch.

Figure 2:
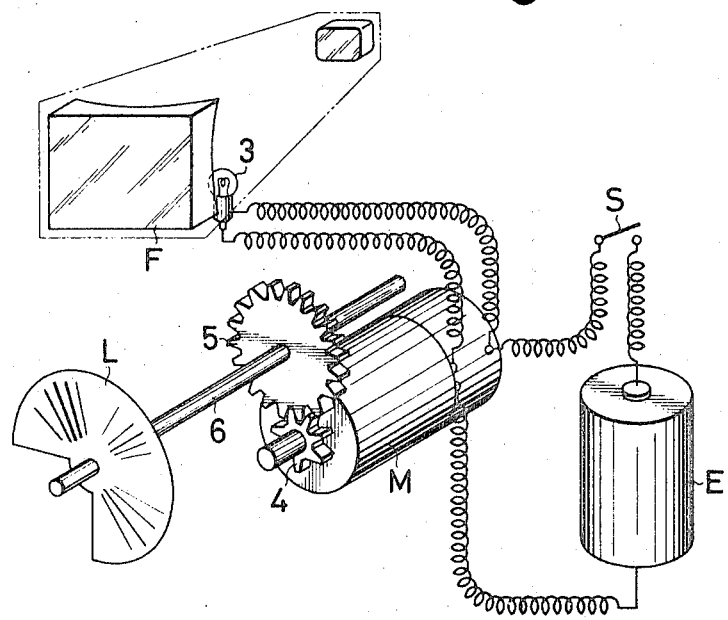
FIG. 2 is a perspective view showing principal parts of an embodiment of this invention.

As illustrated in FIG. 2, for instance, the lamp 3, when incorporated in a miniature cine camera, is so disposed that the photographer can view the lamp within the finder F as it is turned on and off. The switch 2 is incorporated in a motor M. Closing of the switch S permits the battery E to apply voltage to the rotor of the motor M, causing the motor M to rotate and operate a load L such as the shutter mechanism, film transport mechanism or the like by way of gears 4, 5 and a drive shaft 6. If the battery voltage is in excess of the level required for keeping predetermined steady-state rotation, the switch 2 will open to light the lamp 3, whereas if the battery voltage lowers to a level not higher than the above-mentioned voltage level, the switch 2 will be kept closed with the lamp 3 in off state, this indicating the need for change of the battery.

Figure 3:
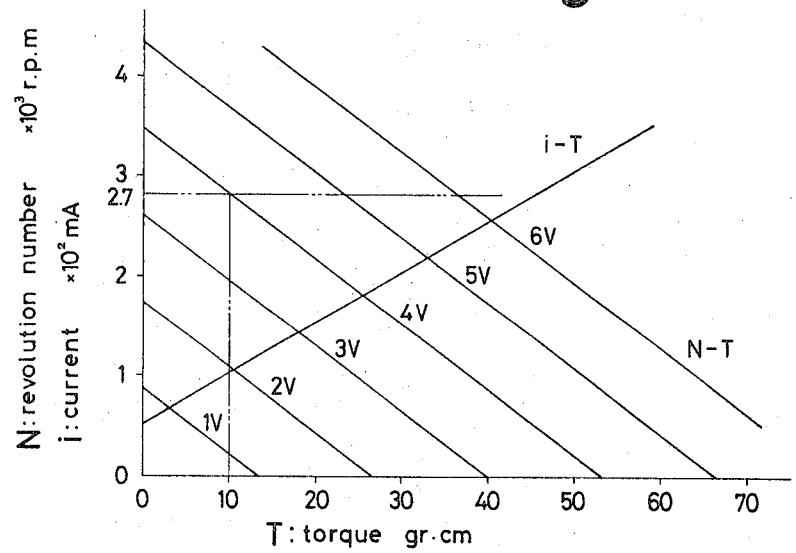
FIG. 3 is a graph showing torque-revolution number and torque-current of the direct current micromotor.

FIG. 3 is a graph showing torque-revolution number and torque-current relations of the direct current micromotor.

If the torque is constant in the case of a direct current micromotor, the current is approximately at a constant level irrespective of the voltage level, and as the torque increases the current also increases approximately in proportion thereto. Assuming, as illustrated, that load torque is 10 gr. cm., normal revolution number for steady-state rotation is 2,700 r.p.m. and voltage and current of the battery are 4 volts and 100 mA respectively, the voltage of 4 volts is a voltage limit for maintaining the revolution number for steady-state rotation. This gives the following equation:

$$\mu \times V(4V) \times i(100 \text{ mA})$$
$$= 1.027 \times 10^{-5} \times T(10 \text{ gr.cm.}) \times N(2,700 \text{ r.p.m.})$$

(1)

wherein $\mu$ is efficiency.

With a direct current micromotor equipped with a speed governor, the rotational speed (i.e., revolution number) is kept constant, so that if the voltage varies, Equation (1) is not applicable. An excess power P supplied from the battery in this case is given by Equation (2), and the excess power will be consumed by the commutator in the motor, discharge between the contacts of the speed governor or the resistor for preventing discharge. With a semiconductor switch, it will be consumed within the semiconductor.

$$P = V \times i(100 \text{ mA}) - V'(4V) \times i(100 \text{ mA})$$

(2)

The excess power P can be utilized for the lighting of the lamp to detect the battery voltage during the rotation of the motor. It therefore follows that the detection of battery voltage is conducted in corresponding relation to the revolution number of the motor which is set stepwise at a plurality of levels. Accordingly, a battery which is no longer capable of giving the highest of the stepwisely set revolution numbers will still be fully serviceable in giving lower revolution numbers.

The embodiments shown in FIGS. 1 and 2 are intended to perform detection of the battery voltage only when the motor is driven under a load and is not adapted for a detecting operation for example in a cine camera in which the film has not been loaded, because the motor is not burdened with a film transport load if the film has not been loaded therein.

Figure 4:
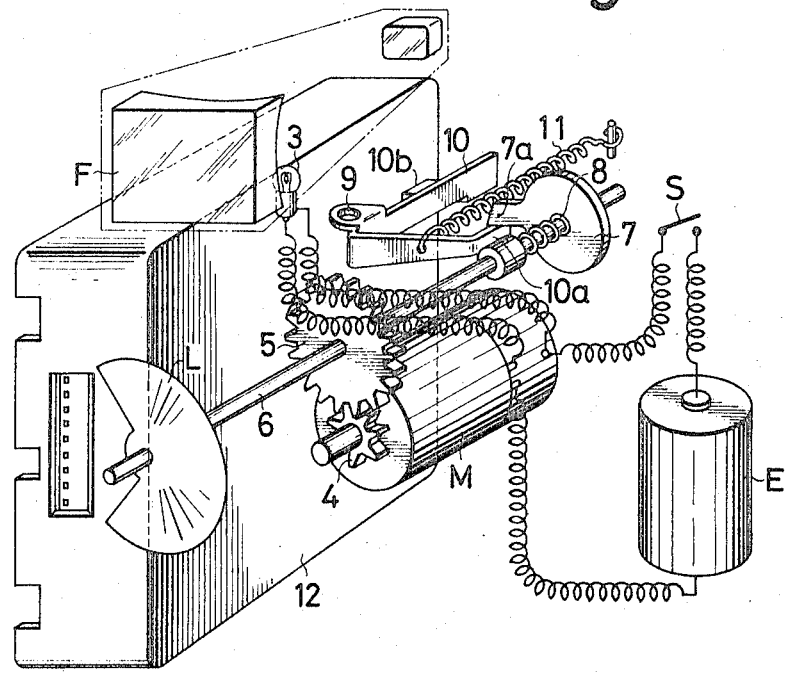
FIG. 4 is a perspective view showing an embodiment of mechanism according to this invention for giving a mechanical load to the motor during its idle rotation.

FIG. 4 shows an embodiment to be incorporated in a cine camera or the like as described above and including a mechanically operative means which, when film has not been loaded, is capable of loading the motor almost to the same extent as when the film is loaded so as to permit detection of the battery voltage as in the film-loaded camera.

Referring to FIG. 4, a friction plate 7 and a spring 8 are mounted on a drive shaft 6 for a load L to be rotated by a motor M by way of gears 4 and 5 a friction disc being fixed on shaft 6 directly rearwardly of and engaged by the friction plate 7 in the known manner, as shown for example in U.S. Pat. No. 3,519,340. The friction plate 7 rotatably mounted on the drive shaft 6 gives frictional resistance to the drive shaft 6 under the resilient force of the spring 8 when the rotation of the friction plate is prevented during the rotation of the drive shaft 6. When set free for rotation, the friction plate 7 rotates along with the drive shaft 6, freeing the shaft from the frictional resistance.

The friction plate 7 has a projection 7a on its outer periphery. A latch member 10, pivoted to an unillustrated pin on the camera frame with its hole 9 fitted on the pin, has an arm 10a which is so urged by a spring 11 as to be engageable with the projection 7a. While a film container such as a film cartridge 12 has not been loaded in the camera, the arm 10a is in engagement with the projection 7a, with a driven projection 10b at the other end of the latch member 10 projecting into a chamber for accommodating the cartridge 12. Thus there are provided loading means which comprises a friction member mounted on a drive shaft to be driven by the motor and a latch member engageable with and disengageable from the friction member, the latch member being engageable with the friction member when the load to be operated by the motor is removed to give the drive shaft frictional resistance approximately equal to the load, the latch member being adapted to be disengaged from the friction member upon detecting that the load to be operated by the motor is placed thereon to thereby free the drive shaft from the frictional resistance,.

When the cartridge 12 is loaded in the chamber, the side face of the cartridge pushes the driven projection 10b, causing the latch member 10 to rotate against the spring 11 and thereby disengaging the arm 10a from the projection 7a of the friction plate 7, whereby the friction plate 7 is set free for rotation along with the drive shaft 6.

Thus during usual photographing operation with the film loaded in the camera, the latch member 10 is retracted to such position as to permit rotation of the friction plate 7 and the motor M is therefore driven under the load L of the shutter mechanism, film transport mechanism or the like which is driven by the drive shaft 6. If the voltage applied to the rotor in this case is in excess of the level required for maintaining steady-state rotation of the motor, the switch 2 in FIG. 1 opens and closes to turn on the lamp 3, whereas if the voltage is not higher than the required level, the switch 2 will be kept closed with the lamp 3 in off state.

On the other hand, if the film has not been loaded, the latch member 10 has its arm 10a engaged with the projection 7a of the friction plate 7 under the action of the spring 11. Closing of the main switch S in this state permits the battery E to apply voltage to the rotor 1 to rotate the motor M. Although the drive mechanism is free of the load for film transport, it is instead loaded with a frictional force acting between the friction plate 7 and the drive shaft 6. By setting this frictional force approximately at the same level as the load of film transport, the lamp 3 can be lighted if the voltage applied to the rotor 1 is in excess of the level required for operating the load, while conversely the lamp 3 is kept turned off if the voltage is not higher than the required level.

In this way the battery voltage can be detected by closing the main switch S irrespective of whether the film is loaded or not.

Since the load to be applied to the motor by film transport varies depending on the type of film or the manufacturer of film, the foregoing frictional force is suitably determined with the variation of the load taken into consideration.

What is claimed is:

1. An apparatus for detecting battery voltage comprising,
    a direct current micromotor,
    a network including speed governor for keeping steady-state rotation of the motor by regulating current flowing through the rotor of the motor,
    a battery serving as a power source for supplying power to the motor by way of a main switch and the speed governor, and indicator means, including a lamp connected in said speed governor network and energized by said network by the power delivered thereto from said battery minus that required for maintaining said motor under load at said steady state.

2. The apparatus as set forth in claim 1 wherein there is provided loading means by which, when the load to be operated by the direct current micromotor is removed, a load approximately equal to the load is given to the operating system.

3. The apparatus as set forth in claim 2 wherein the loading means comprises a friction member mounted on a drive shaft to be driven by the motor and a latch member engageable with and disengageable from the friction member, the latch member being engageable with the friction member when the load to be operated by the motor is removed to give the drive shaft frictional resistance approximately equal to the load, the latch member being adapted to be disengaged from the friction member upon detecting that the load to be operated by the motor is placed thereon to thereby free the drive shaft from the frictional resistance.

4. The apparatus as set forth in claim 1 which is an apparatus for detecting battery voltage for a cine camera and the lamp is so disposed as to be viewable within the camera finder as it is turned on and off.

5. The device as set forth in claim 1, wherein said speed governor includes a current regulating means connected in series with said micromotor, and said lamp is connected across said current regulating means.

6. The device as set forth in claim 5, wherein said current regulating means is a switching means.

7. An apparatus for indicating the condition of a motor energizing battery comprising:
    a battery;
    a direct current motor;
    a speed governor driven by said motor and including a switch device transferrable between open and closed conditions in response to said motor rotating above and below a predetermined speed, said motor being connected through said switch device to said battery; and
    an electric lamp connected across said switch.

* * * * *